3,284,439
PROCESS FOR THE PREPARATION OF METHYL α-THIOLINCOSAMINIDE AND 4 - ETHYL-L-HYGRIC ACID HYDRAZIDE
Alexander D. Argoudelis, Kalamazoo, Mich., assignor to The Upjohn Company, Kalamazoo, Mich., a corporation of Delaware
No Drawing. Filed June 15, 1964, Ser. No. 375,325
4 Claims. (Cl. 260—210)

This invention relates to a novel process for the production of 4-ethyl-L-hygric acid, mineral acid salts thereof, a novel hydrazide thereof (III), and methyl α-thiolincosaminide.

The novel process of this invention and the products can be illustratively represented by the following formulae:

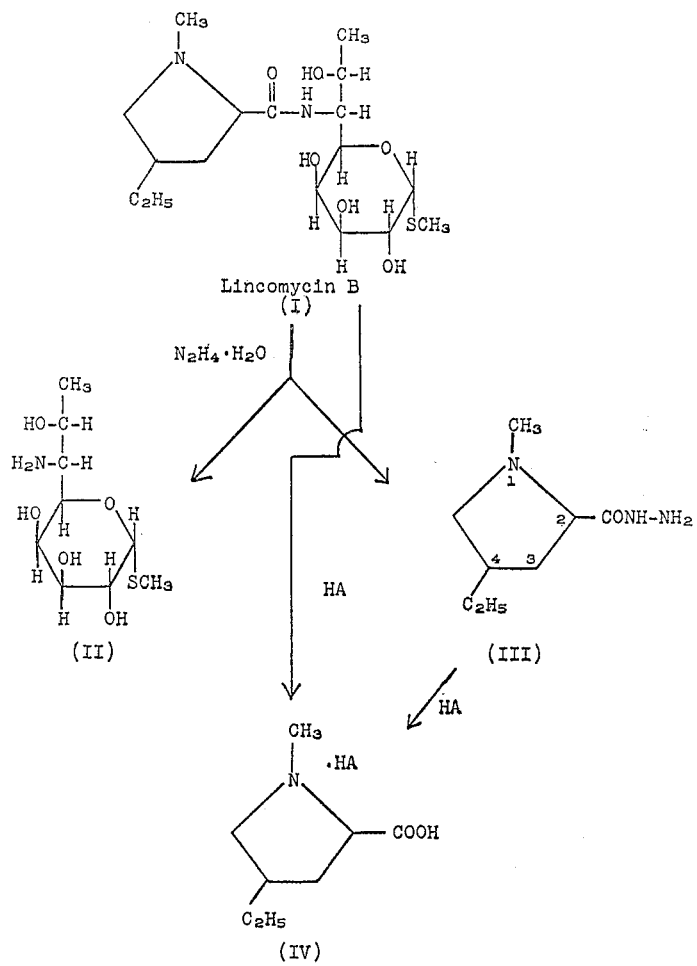

wherein HA is a mineral acid, e.g., hydrochloric, hydrobromic, hydriodic, chloric, sulfuric, and the like.

The process of the present invention comprises: reacting the antibiotic lincomycin B (I) (described in U.S. application S.N. 354,688, filed March 25, 1964) with either hydrazine hydrate or with a mineral acid to obtain 4-ethyl-L-hygric acid as the hydrazide (III) or respectively a mineral acid salt (IV), and methyl α-thiolincosaminide (II).

Methyl α-thiolincosaminide is an important intermediate in the production of antibiotics of the lincomycin type in which methyl α-thiolincosaminide is acylated with substituted prolines as, for example, in lincomycin itself (U.S. Patent 3,086,912). The newly formed 4-ethyl-L-hygric acid is a valuable intermediate for the production of quaternary ammonium salts of its esters or amides. For example, the 4-ethyl-L-hygric acid, dissolved in methanol, can be treated with gaseous hydrogen chloride to give the methyl ester of 4-ethyl-L-hygric acid, which ester is then treated with dodecyl iodide to give the dodecyl iodide of methyl 4-ethyl-L-hygrate. The latter compound is useful as the active ingredient in electrocardiographic jellies. An electrocardiographic jelly can be prepared by mixing, e.g., 5 parts by weight of glycerol with 10 parts of starch and 100 parts of water and then adding the dodecyl iodide of methyl 4-ethyl-L-hygrate (60 parts by weight). Such a jelly is electroconductive and a wetting agent and moreover is also antiseptic.

The following examples are illustrative of the process and the novel product of the present invention, but are not to be construed as limiting.

EXAMPLE 1

*Hydrazinolysis of lincomycin B*

A. LINCOMYCIN B FREE BASE

The whole beer from a fermentation procedure as disclosed in Example 1, U.S. Patent 3,086,912 (26,400 gal. assaying 572 mcg./ml.) was adjusted to pH 3.0 with 305 gal. of 60% sulfuric acid and filtered at 20° C. on a precoat filter using 5800 lbs. of diatomaceous earth as a precoat with no admix added to the whole beer. The filtered beer (24,000 gal. assaying 318 mcg./ml.) was adjusted to pH 8.0 with 50% sodium hydroxide solution, heated to 45° C., and pumped through a polishing filter press, a flowmeter and downflow through 5 carbon columns connected in series. Each carbon column contained 240 lbs. of 40 mesh granular carbon. The filtered beer was put through starting at 20 gal. per minute and ending at 10 gal. per minute. The carbon columns were then washed serially (forward) downflow with 1160 gallons of hot (50° C.) water at a rate of 4 gal. a minute. The columns were then blown dry and eluted in reverse series downflow with 200 gal. of 99% acetone at 40° C. at 3 gal. per minute, followed by 2300 gal. of 75% aqueous acetone at 50° C. at 2 gal. per minute. The acetone eluates were combined and concentrated under reduced pressure to an aqueous concentrate (80 gal. assaying 80,000 mcg./ml.). The aqueous concentrate was cooled to 28° C., adjusted to pH 10.6 with 1.5 gal. of 50% sodium hydroxide solution, and extracted with 80 gal. of methylene chloride. The aqueous concentrate was extracted five additional times with 20 gal. of methylene chloride each time. The methylene chloride extracts were filtered through 15 pounds of diatomaceous earth and concentrated to 20 gal. volume under vacuum. Deionized water (9.5 gal.) was added and concentration was continued to a 14 gal. volume. The concentrate was brought to a volume of 19 gal. by the addition of 5 gal. of deionized water, cooled to 28° C. and adjusted to pH 1.0 with 1.5 gal. of concentrated hydrochloric acid. Acetone (190 gal.) was added to the acidified aqueous solution and the mixture was cooled to 10° C. and stirred overnight; evaporation loss was 29 gal. The solids were filtered on a 36-inch filter pot and washed with 8 gal. of 100% acetone; net weight of crude crystalline material was 30.75 kg. The 30.75 kg. were dissolved in 8.5 gal. of warm deionized water (1 liter/kg.) and filtered through 5 lbs. of diatomaceous earth. The filtrate was stirred with 85 gal. of warm (35° C.) acetone, the mixture was seeded with lincomycin crystals, and stirring was continued for 3 hours while cooling to 10° C. The crystals were filtered on a 36-inch filter pot, washed with 5 gal. of acetone, and dried under vacuum at 60° C. for 48 hours; yield, 24.3 kg. of lincomycin hydrochloride. The mother liquors and wash from the above crystallization steps were concentrated to an aqueous concentrate (13.2 liters), and one liter of this concentrate (pH 4.9) was adjusted to pH 9.5 by the addition of 2 N-sodium hydroxide solution, and extracted three times with 400 ml. of methylene chloride. The methylene chloride extract was concentrated to dryness to yield 85.0 g. of a mixture of lincomycin free base and lincomycin B free base.

Ten grams of this mixture of lincomycin and lincomycin B were dissolved in 75 ml. of the lower phase of a solvent system consisting of equal volumes of 1-butanol and water. The solution was adjusted to pH 4.2 by the addition of 1 N aqueous hydrochloric acid, mixed with an equal volume of the upper phase of the above-mentioned system, and transferred to an all-glass, Craig counter current distribution (10 ml. per phase) apparatus. After 800 transfers the distribution was analyzed by solids determination and thin-layer chromatography. Analysis by thin-layer chromatography showed that tubes 60–90 contained lincomycin B, tubes 91–100 contained a mixture of lincomycin and lincomycin B, and tubes 101–160 contained lincomycin only. Tubes 60–90 were first concentrated and then freeze-dried; yield of lincomycin B, 960 mg.

B. HYDRAZINOLYSIS OF LINCOMYCIN B

A solution of 500.9 mg. of lincomycin B free base in 10 ml. of hydrazine hydrate was heated under reflux for a period of 24 hours and then evaporated to dryness in vacuo. The residue was stirred with 10 ml. of acetonitrile; it partially dissolved. The material which was insoluble in acetonitrile was isolated by filtration, dried, and recrystallized from 4 ml. of dimethyl formamide to give 172 mg. of crystalline, colorless methyl α-thiolincosaminide having a melting point of 213–215° C. and a rotation of $[\alpha]_D^{25}$ +274° (c., 0.782, water) U.S. application S.N. 276,568, filed April 29, 1963, now U.S. Patent No. 3,179,565, issued April 20, 1965).

Analysis.—Calcd. for $C_9H_{19}NO_5S$: C, 42.72; H, 7.57; N, 5.54; S, 12.67. Found: C, 42.27; H, 7.64; N, 5.53; S, 12.40.

The acetonitrile filtrate was evaporated to dryness in vacuo and the thus-obtained residue was recrystallized three times from methanol to give 4-ethyl-L-hygric acid hydrazide (III) in crystalline form.

EXAMPLE 2

4-ethyl-L-hygric acid hydrochloride

An acetonitrile filtrate obtained as described above in Example 1–B was evaporated to dryness. The residue was dissolved in 15 ml. of 6 N aqueous hydrochloric acid and the solution was heated under reflux for 6 hours, and then evaporated to dryness. The residue was dissolved in 30 ml. of water and the solution was adjusted to a pH of 7 by the addition of solid silver carbonate. Insoluble material was removed by filtration and the brown filtrate was decolorized with active charcoal (Darco G-60). The thus-obtained clear solution was freeze-dried to give a solid which was dissolved in 3 ml. of a 1 N solution of hydrogen chloride in methanol. To this solution was added 5 ml. of absolute methanol, 10 ml. of acetone and then ether until the solution became cloudy. The precipitated crystalline material was recovered by filtration and recrystallized from a mixture of acetonitrile, acetone and ether to give 71 mg. of colorless crystals of 4-ethyl-L-hygric acid hydrochloride having the following physical constants:

I.R. Spectrum: This material showed the following absorption bands in cm.$^{-1}$: 3520 (M), 3450 (M), 2710 (W), 2660 (W), 2580 (W), 2500 (W), 1745 (S), 1700 (W), 1605 (W), 1225 (S), 1185 (S), 1150 (W), 1115 (W), 1090 (W), 1020 (M), 840 (M), 805 (M).

Band intensities as indicated in the above infrared spectrum are referred to as "S," "M," and "W." They are approximated in terms of the backgrounds in the vicinity of the bands; an "S" band is of the same order of intensity as the strongest band in the spectrum, an "M" band is between ⅓ and ⅔ as intense as the strongest band, and a "W" band is less than ⅓ as intense as the strongest band. These estimates are made on the basis of a percent transmission scale.

Specific Rotation: (1) In water, at pH ca. 4.5, $[\alpha]_D^{25}$ −46° (c., 0.48). (2) In alkaline water, at pH ca. $[\alpha]_D^{25}$ −64° (c., 0.48).

Analysis.—Calcd. for $C_8H_{15}NO_2 \cdot HCl$: C, 49.65; H, 8.34; N, 7.24; Cl, 18.32. Found: C, 48.54; H, 8.35; N, 7.05; Cl, 18.52.

EXAMPLE 3

Acid hydrolysis of lincomycin B

Two grams of lincomycin B free base were dissolved in 60 ml. of 6 N hydrochloric acid and heated under reflux for ½ hour. The mixture was evaporated to dryness, and the residue was dissolved in 20 ml. of water and extracted twice with 10-ml. portions of chloroform; the chloroform portions were discarded. The aqueous phase was diluted with 60 ml. of water and extracted twice with 20-ml. portions of 1-butanol; the butanol fractions were discarded. The aqueous solution was evaporated to dryness, and the residue was dissolved in 20 ml. of ethanol, treated with decolorizing carbon (Darco G-60) and filtered. To the filtrate was added 100 ml. of ether, and the precipitate which formed was removed by filtration. After decolorizing the filtrate with active carbon, 1,000 ml. of ether was added to it, and the solution was cooled in the refrigerator. The crystals of 4-ethyl-L-hygric acid hydrochloride which formed were collected by filtration. Two recrystallizations from water gave colorless crystals of 4-ethyl-L-hygric acid hydrochloride.

I claim:
1. 4-ethyl-L-hygric acid hydrazide.
2. A process for the production of methyl α-thiolincosaminide and 4-ethyl-L-hygric acid hydrazide which comprises: heating lincomycin B free base of formula:

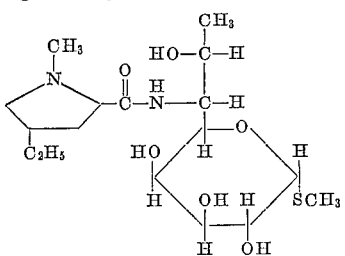

with hydrazine hydrate to obtain methyl α-thiolincosaminde of the formula:

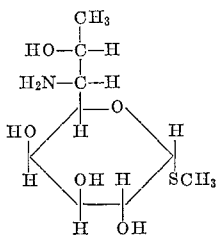

and 4-ethyl-L-hygric acid hydrazide.

3. The process of claim 2 wherein the methyl α-thiolincosaminide and 4-ethyl-L-hygric acid hydrazide are separated from each other by treating the mixture with acetonitrile and separating the acetonitrile-insoluble methyl α-thiolincosaminide from the acetonitrile-soluble 4-ethyl-L-hygric acid hydrazide.

4. A process for the preparation of methyl α-thiolincosaminide and 4-ethyl-L-hygric acid hydrochloride having the following physical constants:

I.R. spectrum in cm.$^{-1}$: 3520, 3450, 2710, 2660, 2580, 2500, 1745, 1700, 1605, 1225, 1185, 1150, 1115, 1090, 1020, 840, 805;

specific rotation: (1) in water at pH ca. 4.5 $[\alpha]_D^{25}$ —46° (c., 0.48), (2) in alkaline water, at pH ca. 11, $[\alpha]_D^{25}$ —64° (c., 0.48);

Analysis.—Calcd. for $C_8H_{15}NO_2 \cdot HCl$: C, 49.65; H, 8.34; N, 7.24; Cl, 18.32; found: C, 48.54; H, 8.35; N, 7.05; Cl, 18.52;

which comprises: heating lincomycin free base of the formula:

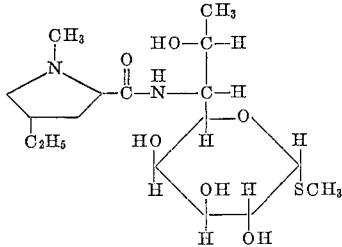

with hydrazine hydrate to obtain methyl α-thiolincosaminide of the formula:

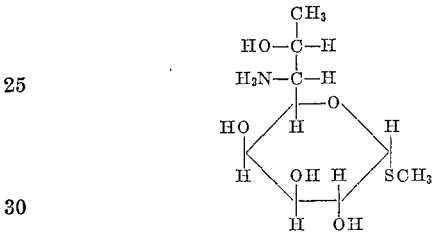

and 4-ethyl-L-hygric acid hydrazide, separating these compounds from each other and hydrolyzing 4-ethyl-L-hygric acid hydrazide with hydrochloric acid to 4-ethyl-L-hygric acid hydrochloride defined as above.

No references cited.

ELBERT L. ROBERTS, *Acting Primary Examiner.*
JOHNNIE R. BROWN, *Assistant Examiner.*